Feb. 17. 1925.

J. A. O'NEIL 1,526,487

AUTOMOBILE BED

Filed April 3, 1924

James A. O'Neil, Inventor

By A. J. O'Brien

Attorney

Patented Feb. 17, 1925.

1,526,487

UNITED STATES PATENT OFFICE.

JAMES A. O'NEIL, OF GEBO, WYOMING.

AUTOMOBILE BED.

Application filed April 3, 1924. Serial No. 703,918.

*To all whom it may concern:*

Be it known that I, JAMES A. O'NEIL, a citizen of the United States, residing at Gebo, county of Hot Springs, and State of Wyoming, have invented certain new and useful Improvements in Automobile Beds; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in automobile bodies and has for its object to produce an improved construction of the rear seat which will make it possible to convert the body into a bed.

It is common of late for people who own automobiles to go on extended trips of several hundred miles, most of which may be through mountains, deserts and country places where sleeping accommodations cannot be had. Such tourists are, as a rule, provided with camping outfits, including beds and tents. It is difficult, however, to secure beds that are comfortable and which can be folded into compact bundles for transportation.

It is the object of this invention to modify the construction of the rear seat of an automobile in such a manner that it can be utilized in the formation of a bed within the car body.

My invention, briefly described, consists in providing a board or platform which is adapted to receive and support the rear seat cushion. This platform is connected with the floor of the car body by means of two pairs of toggles, one pair at each end. By raising the platform the toggles will straighten and serve to hold it in elevated position. In addition to the vertically adjustable rear seat, I provide two hinged metal frames with woven wire sides and supports, which can be connected to suitable brackets carried by the movable platform for the purpose of extending the same sufficiently to form a bed.

In order better and more clearly to describe my invention, I shall have reference to the accompanying drawing in which the preferred embodiment thereof is shown, and in which.

Figure 1:
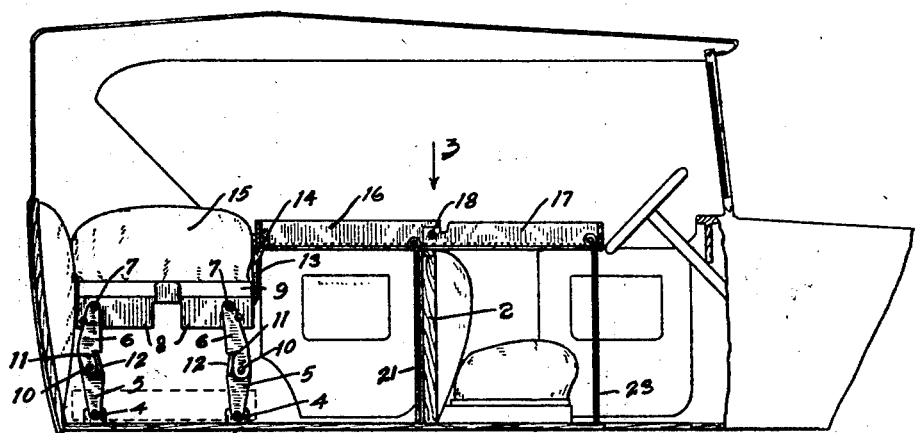
Fig. 1 is a side elevation of an automobile body constructed in accordance with my present invention, the near side being removed. This view shows the parts assembled for sleeping.
Figure 2:
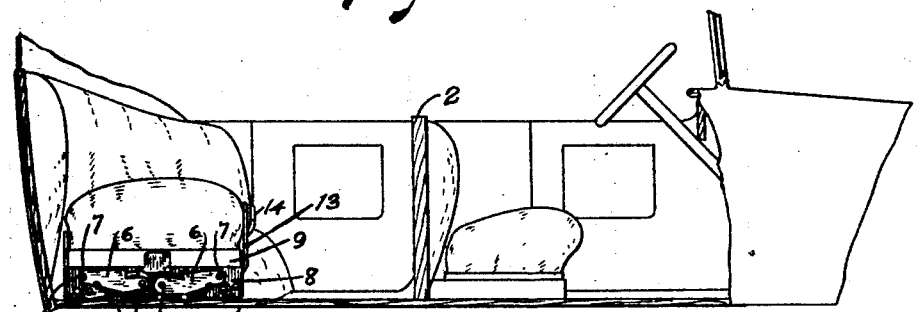
Fig. 2 is a view similar to that of Fig. 1, but shows the parts in inoperative or collapsed position.
Figure 3:
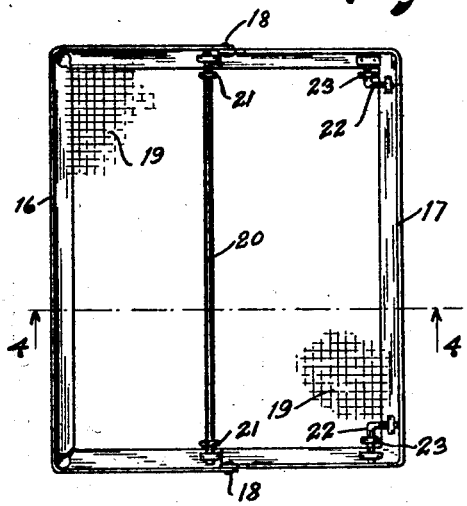
Fig. 3 is a plan view of the foldable section looking in the direction of the arrow 3 in Fig. 1.
Figure 4:
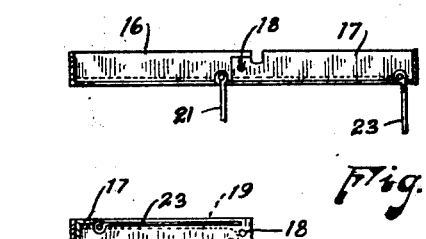
Fig. 4 is a section taken on line 4—4, Fig. 3.
Figure 5:
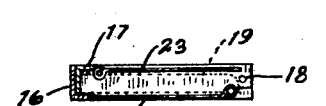
Fig. 5 shows the parts of Fig. 4 folded.

Numeral 1 indicates the floor of an automobile body and 2 the partition member which serves as the back of the front seat. My invention involves no changes in the ordinary construction of the automobile with the exception of the rear seat, which is constructed as follows: I secure to the floor of the car body two pairs of brackets 4 to which is pivoted the lower members 5 of two pairs of toggles. The upper members 6 of the toggles are pivoted at 7 to the downturned flanges 8 of the supporting platform 9. The toggles are pivotally connected at 10 and may be extended into the position shown in Fig. 1 or folded into the position shown in Fig. 2. The upper members 6 are provided with notches 11, which cooperate with the lugs 12 on the parts 5 to hold the parts in extended position, in the manner shown in Fig. 1. When the rear seat is to be moved from the elevated position shown in Fig. 1 to the normal position, shown in Fig. 2, the supporting toggles are broken inwardly and this permits the seat to be lowered. Extending upwardly to the front and near the ends of the platform 9 are brackets 13, each of which has an offset tongue 14 whose function will presently appear. When the rear seat is in elevated position, the seat cushion 15 will serve as a portion of the bed, but evidently this is not of sufficient size to accommodate a full grown person and additional surface is provided by the following means. A rectangular frame such as that shown in Fig. 3 is formed from angle irons 16 and 17, which are each bent into U-shape and pivotally connected at 18. These frames have woven wire cloth 19 attached so as to form a bottom. A rod 20 connects the two sides of the frame and forms a brace. Secured to the rod 20 are supports 21. Secured to each corner of the frame formed by angle 17 is a bracket 22 to which are pivoted the supports 23. When the frame just described is extended, as shown in Fig. 3, it is positioned as shown in Fig. 1. The lugs 14 serve to hold the rear side of the frame, while the other parts thereof are supported on legs 21 and 23. When the parts are positioned, as shown in Fig. 1, the frame serves as a support for the bedding (not shown). When the car is traveling, the frame is folded, as shown in Fig. 5, and placed under the platform 9, which is lowered to the position shown in Fig. 2.

It will be seen from the above that I have invented an arrangement of parts whereby it is possible to form a supporting surface for bedding, and which, when not so employed, will take up no additional space. In fact, when properly constructed, the automobile body will not visibly differ from one made in the ordinary manner.

Having now described my invention, what I claim as new is:

Means for converting an automobile body, having a floor and two spaced seats, into a bed, comprising, in combination, two pairs of brackets secured to the floor directly underneath the rear seat, a pair of toggles pivoted at their lower ends to each pair of brackets, a supporting platform pivotally connected to the upper ends of said toggles, said platform being adapted to support a seat cushion, means for preventing the toggles from breaking when they are in extended position, a foldable framework adapted to be attached to the front edge of the platform, and means for supporting the framework at such an elevation that the upper surface thereof is substantially in the same horizontal plane as the top of the seat cushion whereby an extended surface is obtained for the support of bedding.

In testimony whereof I affix my signature.

JAMES A. O'NEIL.